(No Model.)
S. W. BAILEY & H. P. VIGARS.
RAG OR WORSTED WORKER.
No. 340,189. Patented Apr. 20, 1886.
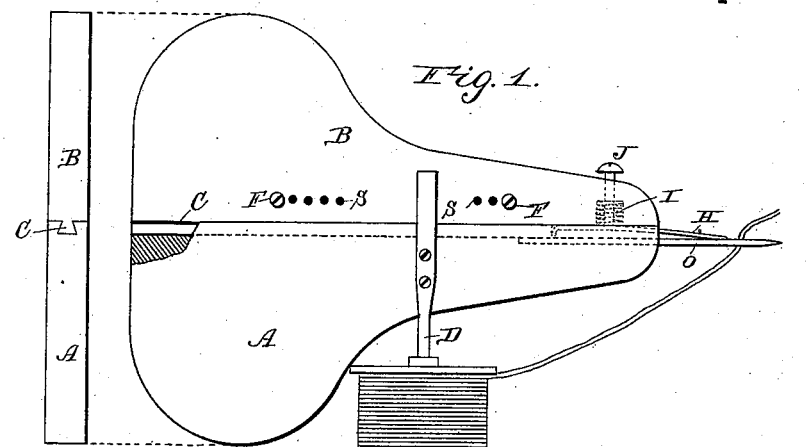
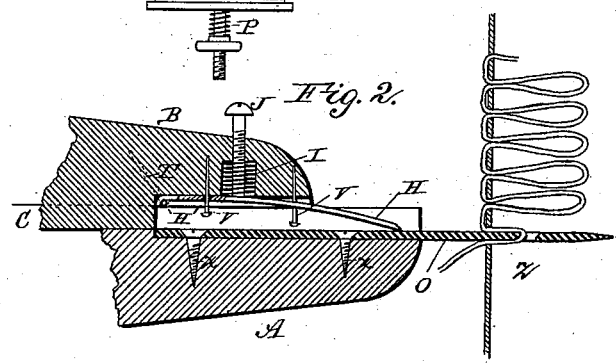
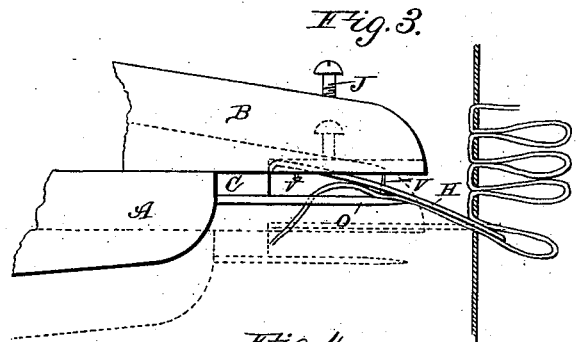
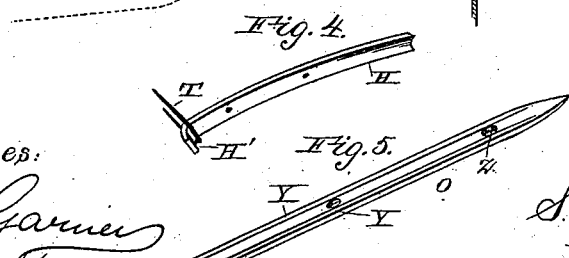
Witnesses:
Inventors:
S. W. Bailey and
H. P. Vigars

United States Patent Office.

SAMUEL W. BAILEY AND HARRY P. VIGARS, OF MARQUETTE, MICHIGAN.

RAG OR WORSTED WORKER.

SPECIFICATION forming part of Letters Patent No. 340,189, dated April 20, 1886.

Application filed January 25, 1884. Serial No. 118,721. (No model.)

*To all whom it may concern:*

Be it known that we, SAMUEL W. BAILEY and HARRY P. VIGARS, of Marquette, in the county of Marquette and State of Michigan, have invented certain new and useful Improvements in Rag or Worsted Workers; and we do hereby declare the following to be a full, clear, and exact description of the invention, such as will enable others skilled in the art to which it pertains to make and use it, reference being had to the accompanying drawings, which form part of this specification.

Our invention relates to rag or worsted workers; and it consists in the combination of two pieces of wood, which are secured together by means of a dovetailed groove, so that they can slide back and forth without becoming detached, one of which is provided with a combined spool-holder and stop and a grooved needle, while the other is provided with a loop-retainer, which bears against the needle, and a set-screw for regulating the size of stitch, all of which will be more fully described hereinafter.

The object of our invention is to provide a rag or worsted worker by means of which patterns or designs drawn on burlap can be worked with either worsted or short pieces of rag, which would otherwise be worthless.

Figure 1 is a plan view of our invention complete. Figs. 2 and 3 are details showing the parts in different positions and the manner of forming the loops, Fig. 2 being a section, so as to disclose the interior construction. Fig. 4 is a detailed perspective of the loop-retainer. Fig. 5 is a similar view of the needle.

A B represent the frame, which is composed of two pieces of any suitable material, either of the shape here shown or any other that may be preferred, and which are connected together by means of a dovetailed rib and groove, C. This allows the two pieces to be worked back and forth upon each other for the purpose of forcing the worsted or rag through the burlap without becoming detached.

Secured to the piece A, at right angles thereto, is the rod D, upon which the spool is placed. Upon the outer end of this rod is formed a screw-thread, so as to receive a nut and a tension-regulating spring, P. The worsted or rag having been wrapped around this spool and the spool placed upon the rod, its inner end is forced either against the stop on the rod or against the edge of the part A, thus producing a suitable friction upon the spool to prevent it from turning too readily. The inner end of this rod D projects over the division-line between the two parts A B, and serves as a stop to limit the extent of movement of the two parts.

Projecting from the part B are the two stops F, which may be adjusted in relation to each other by being placed in either of the series of openings S, and thus prevent the parts from having more than a certain length of stroke or play.

It will be seen that the rod D serves both to carry the spool and as a stop.

In a recess which is formed in the inner side of the part B at one end is pivoted a flat curved loop-retainer, H, which has its inner end curved, as at H', and which is secured in place by the staple or keeper T. Headed pins V pass through openings that are made in the loop-retainer, and serve as stops to limit the movements of its outer end. A spiral spring, I, is located in a recess that is formed in the part B, and through this spring passes a regulating-screw, J, which bears against the loop-retainer. The spring I serves to keep the outer end of the loop-retainer normally pressed against the needle O when the parts are in either of the positions shown in Figs. 1 and 2, and to cause it to extend beyond the path of the needle O when the parts are in the position shown in Fig. 3. The regulating-screw J limits the reverse movements of the loop-retainer when the parts are in the position shown in dotted lines at Fig. 3, when the needle is brought into position to form a new loop.

The outer end of the loop-retainer has suitable points made upon it, so as to catch in the grooves in the inner side of the needle, for the purpose of assisting in holding the two parts A B in line with each other. That side of the loop-retainer which is next to the needle is roughened in any suitable manner, so as to produce sufficient friction where the loop-retainer bears against the needle, to cause the loop-retainer to draw the worsted or rag through the eye of needle as long as the two parts are moving in contact.

The needle O is secured to the part A by means of screws X, and has the grooves Y, hereinbefore mentioned, for receiving the points of the loop-retainer, and an eye, Z, near its outer end, through which the worsted or rag passes.

The operation of our invention is as follows: The piece of burlap having a pattern or design traced or drawn thereon is stretched as tightly across a frame as possible. The thread or narrow rag is passed through the eye of the needle, and then the part A of the frame is moved forward as far as possible upon the part B, so as to force the needle and the worsted or rag with which it is threaded through the burlap, as shown at Fig. 2. The part B is then forced forward, which causes the loop-retainer to pass through the opening formed by the needle. The part A is then forced backward, so as to withdraw the needle from the burlap, while the loop-retainer holds the loop that has just been formed, as shown at Fig. 3. The worker is then pressed against the tension of the spring I in the direction of the line in which the loops are being formed until the loop-retainer strikes against the end of the screw J, as shown in dotted lines at Fig. 3. The needle is then in position to form a new loop, and the operation is repeated until the design which has been drawn upon the burlap has been worked. The length of the loops is regulated by the stops V, and the length of the stitches is regulated by the screw J. After the design of the rug has been worked upon the burlap or other material, the tops of the loops are cut off by means of a pair of shears, and the rug or mat is completed.

When it is not desired to use worsted, short pieces of rag, which would otherwise be worthless, can be used, in which case the spool will not be needed.

Having thus described our invention, we claim—

1. The combination of the parts A B, which are adapted to be worked back and forth upon each other, rod D, secured to one of the parts and adapted to carry a spool upon one end, its opposite end extending over the other part, stops that are adjustably secured to one of the parts for the purpose of striking against the rod D and limiting the play of the parts, needle O, and loop-retainer H, substantially as described.

2. The combination of the parts A B, which are adapted to be worked back and forth upon each other, stops for regulating the play of said parts, needle O, loop-retainer H, pivoted at its inner end, spring I, for pressing the loop-retainer outward, and screw J, for limiting the play of the loop-retainer, and thereby regulating the length of the stitch, substantially as described.

3. The combination of the two parts of the frame with the needle and the loop-retainer, the needle being provided with grooves on its inner face, and the loop-retainer being provided with points on its extended end for entering the grooves in the needle, substantially as described.

4. The combination of the blocks A B, needle O, loop-holder H, holding devices for securing it loosely to the block B, spring, and setscrew, substantially as specified.

5. In an embroidering implement, the combination, with sliding or reciprocating means, as blocks A B, of a needle and a loop-holder, attached, respectively, to the forward ends of said blocks, one of the same being substantially concave and the other substantially convex, as set forth.

In testimony whereof we affix our signatures in presence of two witnesses.

SAMUEL W. BAILEY.
HARRY P. VIGARS.

Witnesses:
OGDEN H. PACKARD,
M. R. MANHARD.